United States Patent [19]

Tachi et al.

[11] Patent Number: 4,570,227
[45] Date of Patent: Feb. 11, 1986

[54] PORTABLE MAP DISPLAY APPARATUS

[75] Inventors: Susumu Tachi; Kiyoshi Komoriya, both of Ibaraki, Japan

[73] Assignees: Agency of Industrial Science & Technology; Ministry of International Trade & Industry, both of Tokyo, Japan

[21] Appl. No.: 407,290

[22] Filed: Aug. 11, 1982

[30] Foreign Application Priority Data

Aug. 17, 1981 [JP] Japan .................................. 56-128479

[51] Int. Cl.⁴ ............................................. G06F 15/50
[52] U.S. Cl. .................................... 364/444; 364/424; 340/990; 340/995
[58] Field of Search ............... 364/424, 436, 443, 444, 364/449, 521; 353/11, 12; 340/988, 990, 995; 343/450–452; 73/178 R

[56] References Cited

U.S. PATENT DOCUMENTS

| | | | |
|---|---|---|---|
| 3,845,289 | 10/1974 | French | 364/436 |
| 3,925,641 | 12/1975 | Kashio | 340/988 |
| 4,301,506 | 11/1981 | Turco | 364/444 |
| 4,312,577 | 1/1982 | Fitzgerald | 364/444 |
| 4,481,584 | 11/1984 | Holland | 364/424 |

Primary Examiner—Gary Chin
Attorney, Agent, or Firm—Schwartz & Weirieb

[57] ABSTRACT

A portable map display apparatus stores, in a memory, features of a plurality of points on a given map and features of routes connecting such points and, on receiving input signals concerning a given point of start and a given destination, sequentially displays, on an output device, the information on the optimum route to be followed in reaching the destination from the point of start.

12 Claims, 7 Drawing Figures

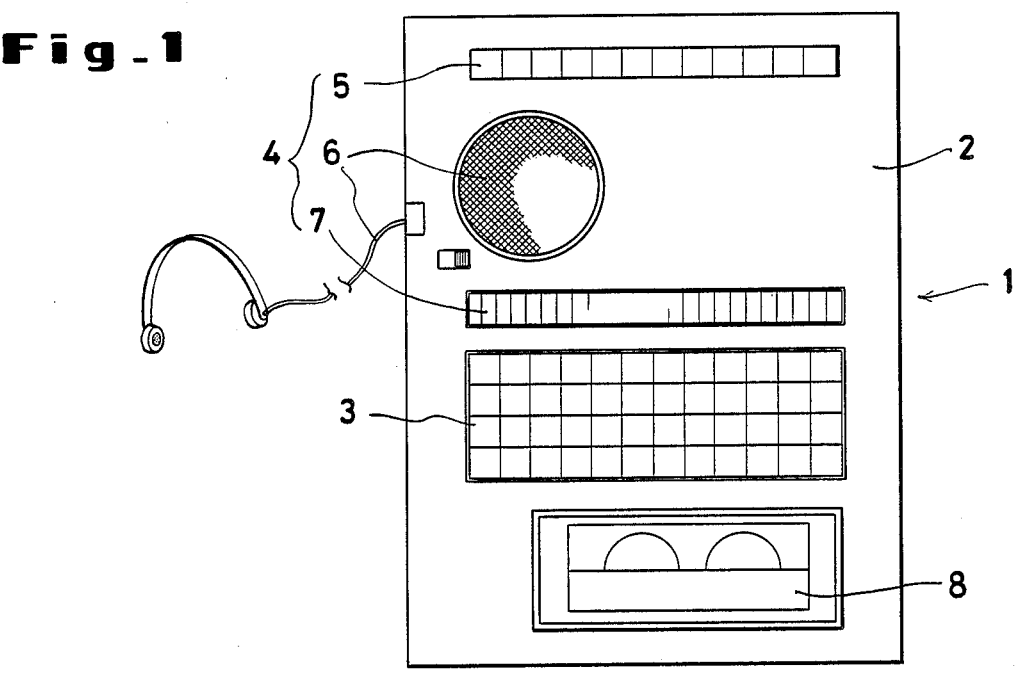
Fig_1
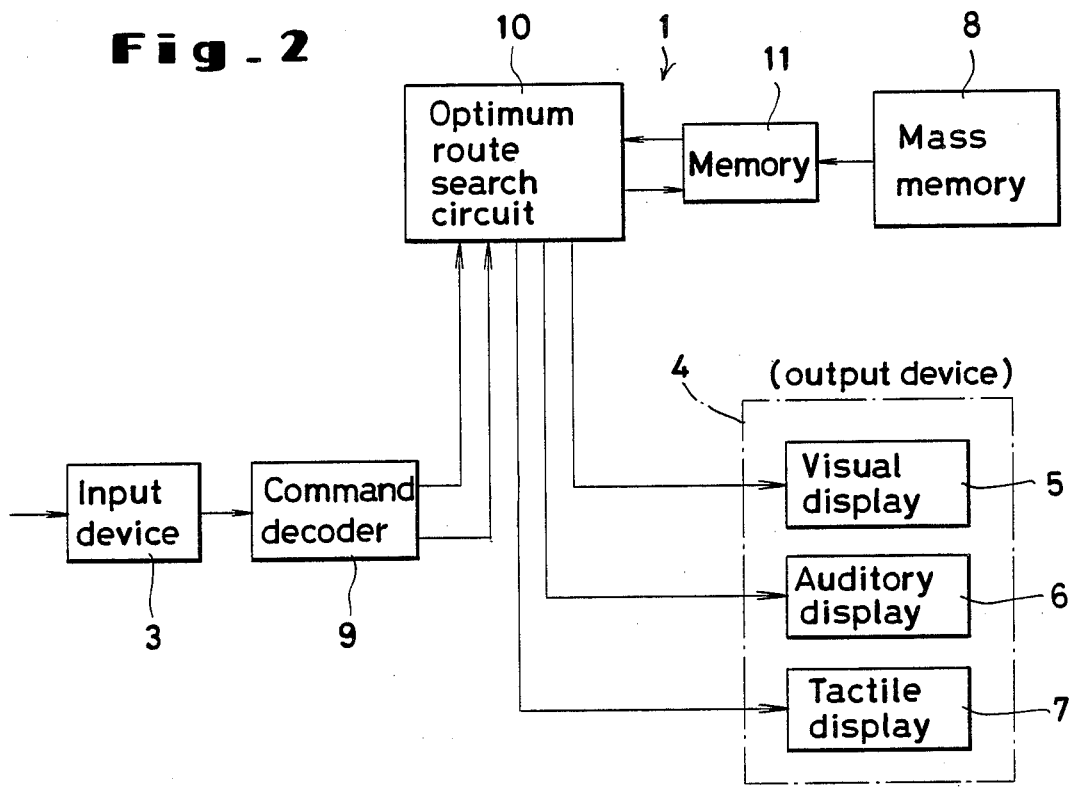
Fig_2

Fig_3
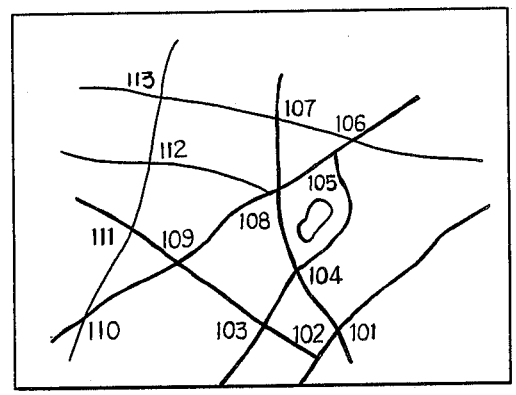
Fig_4
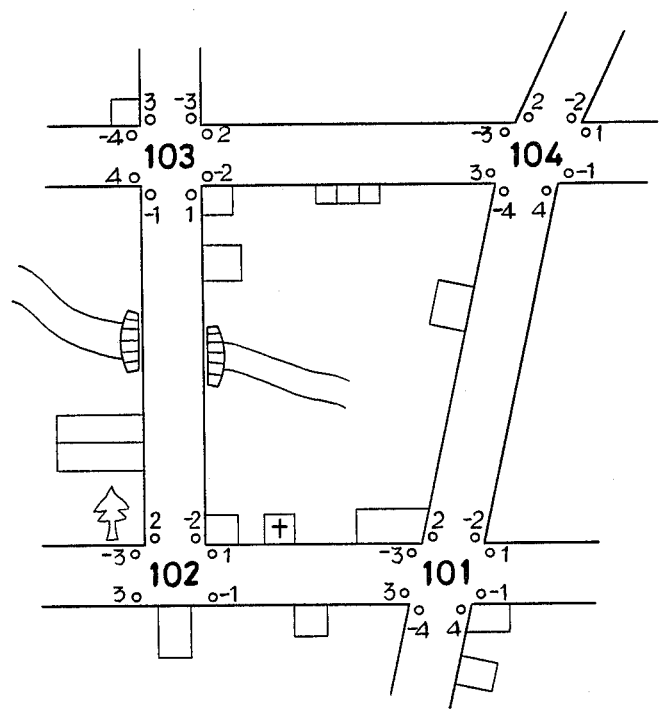

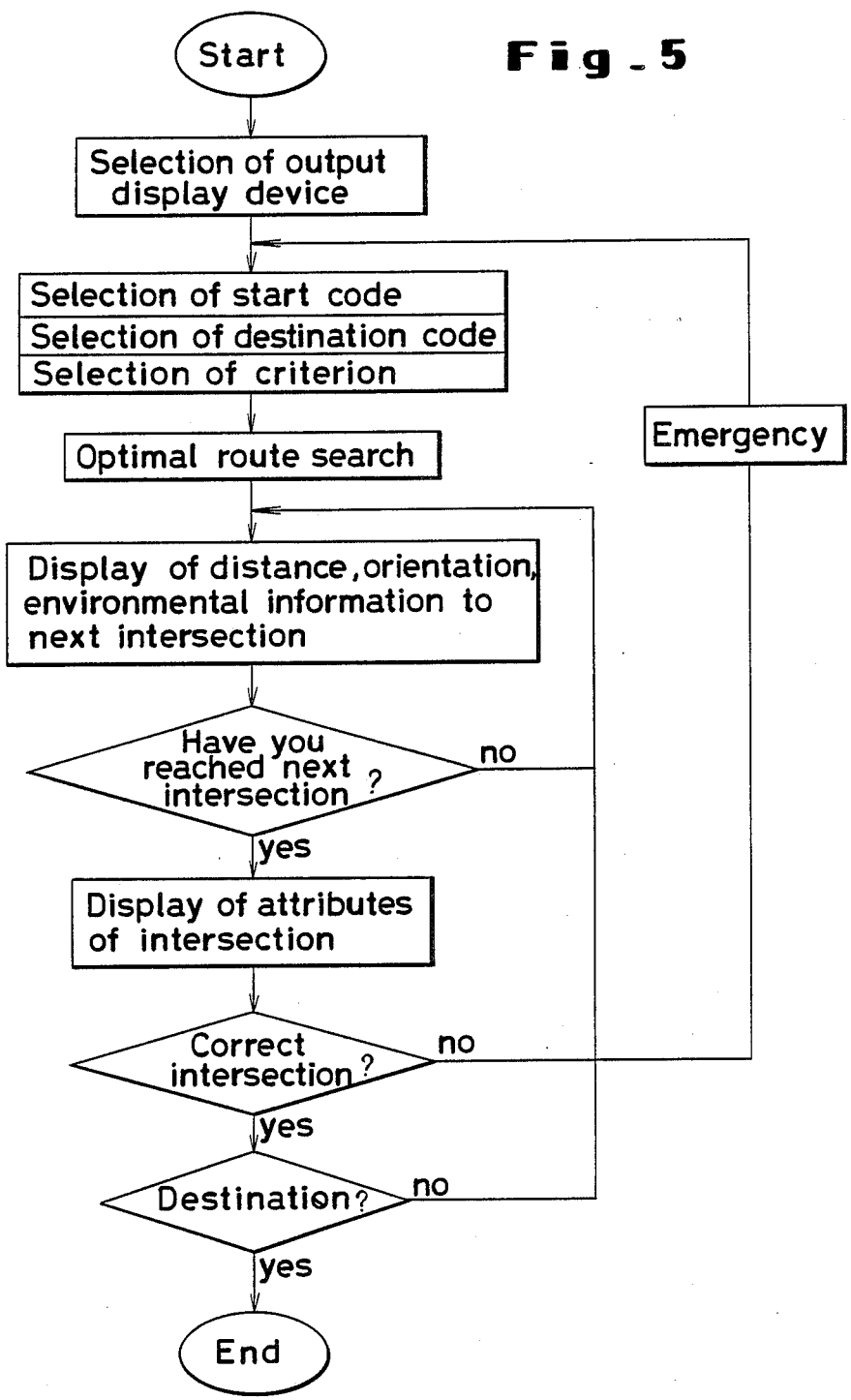
Fig_5

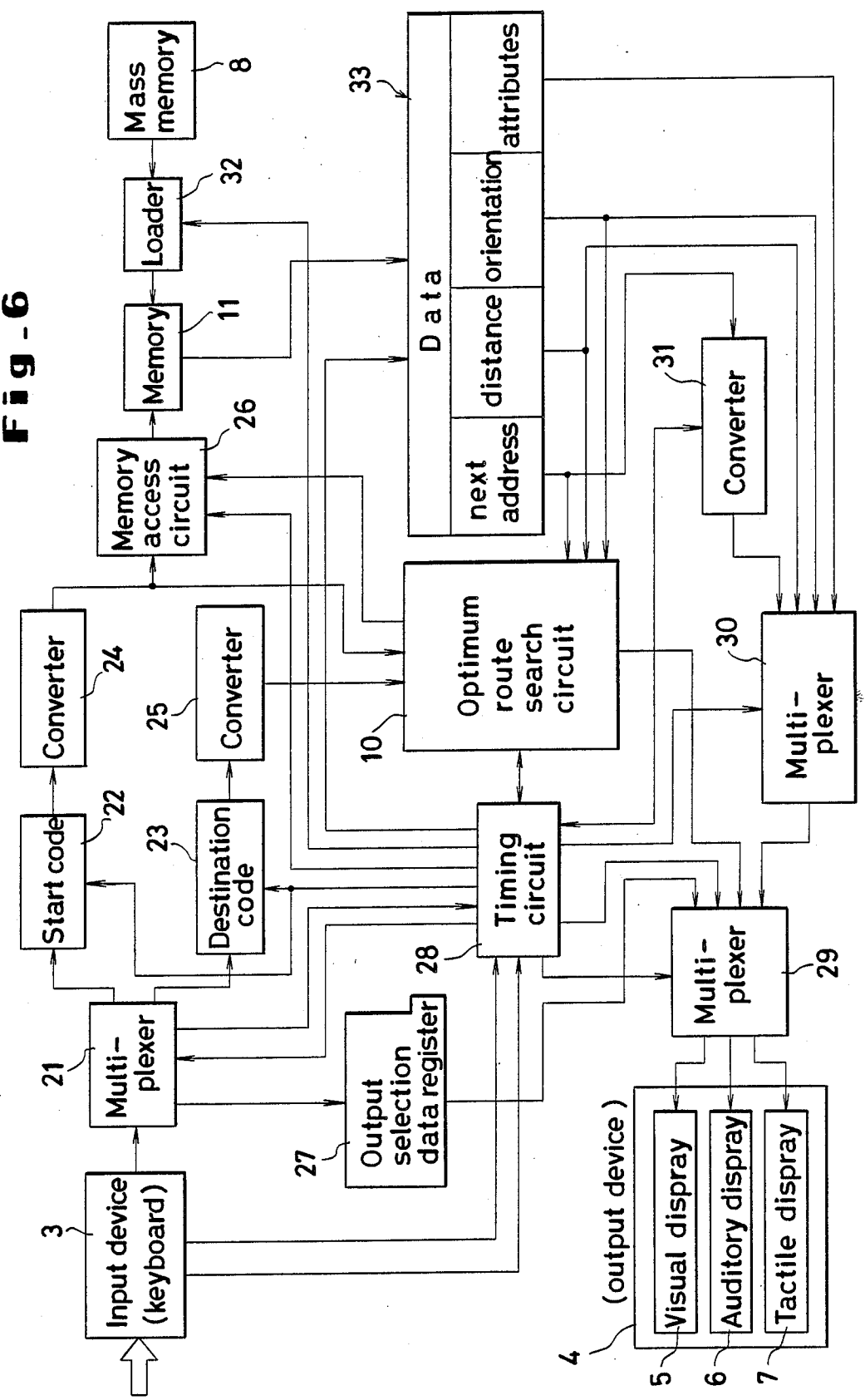

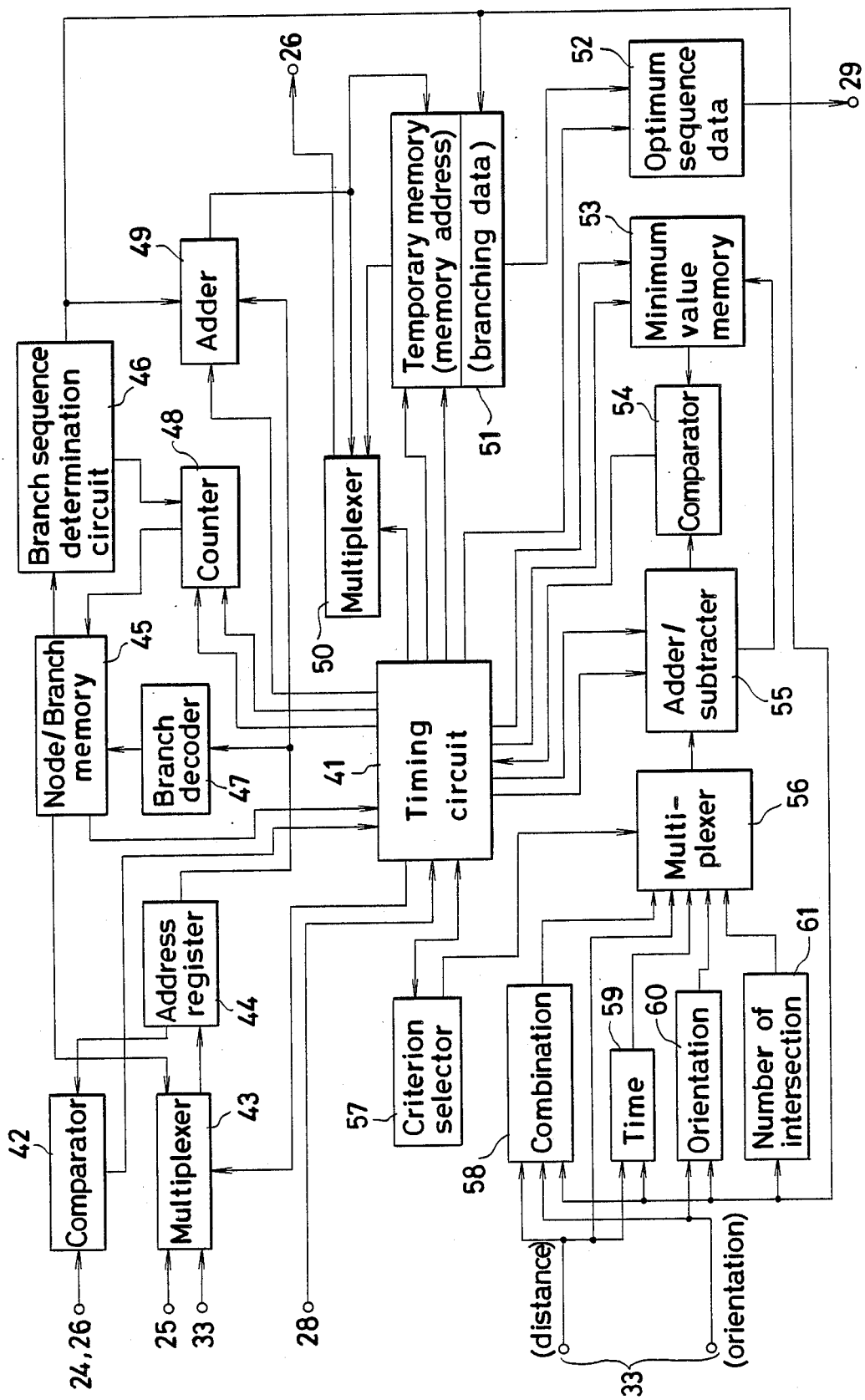

PORTABLE MAP DISPLAY APPARATUS

FIELD OF THE INVENTION

This invention relates to a portable map display apparatus to be used for guiding blind persons, foreigners or other persons who are not acquainted with the geography of a given area from a desired point of start to a desired destination.

BACKGROUND OF THE INVENTION

Generally in an area in which a person is a stranger, the person relies on a map to travel from a given point of start to a desired destination. A map drawn expressly to indicate the area in full detail is rarely available. When a pedestrian wishes to find landmarks such as buildings or particular features of the town, or wishes to find a particular distance with the aid of the map so as to confirm whether or not he is following the correct route from the point of start to the destination, such detailed information is rarely indicated on the map. Although the pedestrian has the map to consult in seeking a correct route for his travel, when the map is his sole guide, it is actually not very easy for him to follow the best route to proceed from the point of start to the destination without getting lost. This difficulty is particularly serious for a blind person or a foreigner who is not acquainted with the geography of the area in question.

The route guide apparatus proposed to date comprises a memory device for memorizing distances, directions, conspicuous landmarks, and the like and means for sequentially reading out and displaying the memorized information. The information on the geography of a fixed route from a desired point of start to a desired destination is memorized in advance. The user of the device operates the apparatus to have the memorized information sequentially displayed so that he may be guided by the displayed information to proceed toward and reach the destination. (Japanese Patent Application Disclosures SHO No. 50(1975)-4956 and SHO No. 50(1975)-98299) In using this conventional route guide apparatus, however, the user must instruct the apparatus in advance as to what route he wishes to take.

OBJECT OF THE INVENTION

An object of this invention is to provide a portable map display apparatus which can be carried by a pedestrian and can be used conveniently by the pedestrian to tell his current position from time to time between the point of start and the destination and help to keep himself correctly on the best route to the designation.

SUMMARY OF THE INVENTION

The object described above is accomplished by this invention by providing a portable map display apparatus which comprises a memory device having memorized therein the features of a plurality of specific points on a map and the features of routes connecting these points, an optimum route search circuit for searching and picking out several routes including several points as points of start, destinations, and points of passage in response to input signals concerning a point of start and a destination, an output display for sequentially displaying features of those points along selected routes and features of the routes themselves, a power supply for driving the components of the apparatus, and a case for receiving the components of the apparatus in respectively fixed positions.

The map display apparatus of this invention is highly convenient because, based on the information stored in advance in the memory device, for example, it displays sequentially the routes automatically selected so as to fulfill the user's requirements such as those of determining the shortest possible distance between the point of start and the destination, of minimizing the number of intersections to be crossed and/or of minimizing the number of corners to be turned.

BRIEF DESCRIPTION OF THE DRAWINGS

Other objects and features of the invention will become apparent to those skilled in the art as the disclosure is made by means of the following description of a preferred embodiment of the invention, and as illustrated in the accompanying drawings, wherein:

FIG. 1 is a front view illustrating one embodiment of the portable map display apparatus according to the present invention.

FIG. 2 is a block diagram of essential components which constitute the portable map display apparatus of this invention.

FIG. 3 is a map of a certain area shown by way of illustration.

FIG. 4 is a map obtained by enlarging one portion of the map of FIG. 3, indicating the memorized information, and coding the relevant items of the information.

FIG. 5 is a flow chart illustrating the procedure required for the operation of the map display apparatus of the present invention.

FIG. 6 is a block diagram of the map display apparatus according to the present invention.

FIG. 7 is a block diagram of the optimum route search circuit used in the map display apparatus of the present invention.

DESCRIPTION OF PREFERRED EMBODIMENT

FIG. 1 represents a front view illustrating the appearance of a typical embodiment of the portable map display apparatus 1 according to this invention. On the case 2 of the map display apparatus 1 there are provided an input device 3 such as a keyboard and an output device 4. The output device 4 is composed of a visual display 5 such as a light emitting diode display, an auditory display 6 such as a speaker or an earphone, and a tactile display 7 such as a braille display unit. A recess is formed in the case 2 to admit therein a large capacity memory 8 such as a cassette tape or bubble memory cartridge. The case 2 further contains therein, as seen in FIG. 2 a command decoder 9, an optimum route search circuit 10, a memory 11, and a power supply (not shown) such as a battery. This large capacity memory 8 is used for memorizing a map. FIG. 3 represents a map of an area. FIG. 4 represents what is obtained by enlarging one portion of the map of FIG. 3 and coding the features of the enlarged portion of the map. A plurality of points on the enlarged map of FIG. 4, namely, the features of intersections of roads, for example, are memorized in the large capacity memory 8. The information to be memorized includes types of intersections (classified as L-form, I-form, crossroad form and five-branched form), code numbers (101, 102, 103, . . . ) obtained by coding the individual intersections, code numbers (1~4 and −1~−4) obtained by coding the corners of each of the intersections with due consideration to the direction of travel, names of buildings located near the intersections, names of owners of such buildings, other conspicuous structures, trees, and scenes capable of being used as landmarks, code numbers of the next intersections to be reached by right turn, left turn, or straight travel, distances to such next intersections, angles of corners to be turned, buildings located en route to the next intersections and conspicuous enough to serve as landmarks, bridges and other similar structures, road conditions such as inclinations, place names and addresses along both sides of streets, and directions to the next intersections. When the aforementioned map is prepared by indicating the intersections with respective code numbers as illustrated in FIG. 3 and it is used in conjunction with the map display device 1, the user will enjoy great convenience as will be described afterward. When the map display apparatus 1 is intended for use by a blind person, all the indications on this map are to be formed with linear reliefs and braille dots.

Now, practical application of the map display apparatus 1 constructed as described above to guiding its user along a selected route from a point of start to a desired destination will be described below.

The user first turns "ON" the power supply of the map display apparatus 1. When he wishes to proceed from the corner "4" of an intersection 101 to the corner "−4" of an intersection 103 as shown on the map of FIG. 4, he is required first to select a proper output device 4 as shown in the flow chart of FIG. 5. This selection of the output device 4 is accomplished as follows. In FIG. 6, when the power supply of the apparatus is turned "ON", a signal from the timing circuit 28 of the command decoder 9 causes the individual output displays 5, 6 and 7 to issue a request for output device selection to the user. When the user wishes to use the visual display and the auditory display, for example, he gives corresponding signals through the input device 3 to the apparatus. The signals are forwarded through the multiplexer 21, the output selection data register 27, and the multiplexer 29 to set the visual display 5 and the auditory display 6 operating. If the user inadvertently gives a wrong signal through the input device, he can correct the error by giving a clear signal to the input device and making a correct keyboard operation of the input device.

Then, the user, in response to the input request signal issued from the timing circuit 28, consults the map shown in FIG. 3 and writes in his point of start, point of destination, and the corners of the intersections in the form of code numbers through the input device 3. The code numbers are intended to indicate relevant intersections. Optionally, the input signal may be in the form of a verbal expression such as "facing west at the intersection of 151 Mass Ave and 64 East St". When the information concerning the point of start and the destination is fed in, the timing circuit 28 responds to the input signal and causes the information concerning the map of a pertinent area to be transferred from the large capacity memory 8 such as a cassette tape via a loader 32 into the memory 11.

At the same time, the information concerning the point of start and the destination is switched in the multiplexer 21 and temporarily memorized in the form of a start code 22 and a destination code 23, and then forwarded to the code/memory address converters 24, 25, there to be converted to memory addresses. These memory addresses are imaginary products based on the map code table and correspond to the memory addresses in the large capacity memory 8. The memory access signal of the point of start is forwarded from the memory access circuit 26 to the memory 11.

Then the user, responding to the input request signal, gives an input signal representing the criterion of his choice concerning the selection of the route between the point of start to the destination. To be specific, the user chooses the criterion of evaluation such as, for example, the minimum distance to be traveled from the point of start to the destination, the minimum number of corners to be turned, or the minimum number of intersections to be crossed, feeds the signal representing the chosen criterion through the input device 3 to the optimum route search circuit 10 via the timing circuit 28. Based on the criterion signal received as described above, the optimum route search circuit 10 performs calculation and picks out the optimum route connecting the point of start and the destination.

One typical block diagram of the optimum route search circuit 10 is illustrted in FIG. 7. The criterion signal brought in through the timing circuit 28 of the command decoder shown in FIG. 6 is transferred through the timing circuit 41 and the criterion selector 57 to the multiplexer 56.

The multiplexer 56 contains five numerals of evaluation functions, (i) through (v), selects one of the five numerals in response to the received signal, and forwards this numeral to the adder/subtracter 55. The five numerals of functions are as follows.

(i) This numeral represents the number of intersections. The output of the circuit 61 assumes the value of "1" each time a route sequence is selected.
(ii) This numeral represents the condition of road orientation. It is determined by the data on direction and the route sequence data. This output signal is issued from an orientation circuit 60.
(iii) This numeral represents the length of time. It is determined by the data on distance and the conditions of travel through intersections (left turn, right turn, or straight travel). This output signal is issued from a time circuit 59.
(iv) This numeral represents the distance itself.
(v) This numeral represents the combination of distance, direction, left turn, right turn, straight travel, number of intersections, or the like. The relevant weight coefficients are fed through the selector 57 into the combination circuit 58 and the resultant product of combination constitutes an input signal for the multiplexer 56.

The multiplexer 56 forwards the numeral of evaluation function selected in response to the criterion selection signal to the adder/subtracter 55. The following description will be made on the assumption that the user has selected the numeral of criterion on the distance (iv) shown above.

When the step of selection, is completed, the criterion selection circuit 57 issues a signal indicating completion of the selection to the timing circuit 41. On receiving the completion signal from the timing circuit 41, the multiplexer 43 selects the start memory address and feeds it to the address register 44. The address register 44 transfers this input signal to the comparator 42. The comparator 42 compares the input signal with the destination memory address signal. When the two signals agree (indicating that the point of start and the destination are the same place), the comparator 42 issues an agreement signal to the timing circuit 41 to effect a relevant processing operation. It also feeds an increment signal to the counter 48.

When the aforementioned two signals in the comparator 42 do not agree and no overflow occurs in the counter 48, the signal of the address register 44 causes the branch information decoder 47 to decode the branch information and, at the same time, it is fed into the node/branch information memory 45. When the counter 48 overflows, the transfer of the signal to the memory 45 is suspended and the branch sequence determination circuit 46 searches back to select a new node and a new branch in the node/branch memory 45 to continue the search along a new branch sequence. In this case the counter 48 is updated by the operation.

Now, the present embodiment will be described on the assumption that the map display apparatus 1 is used for finding the optimum route when the point of start is the point "4" of an intersection 101 and the destination is the point "−4" of an intersection 103 on the map of FIG. 4.

The information within the memory 11 is arranged with respect to each of the number of paths originating at an intersection (number of roads branching off the intersection). By locating the memory address of the point "4" of the intersection 101 in the code/memory address converter 24 illustrated in FIG. 6, therefore, the number of roads branching off the intersection can be found from the memory address. This processing is performed in the branch information decoder 47. In this case, the number of roads branching off the intersection is 3, because the paths originating at the point "4" of the intersection 101 cross the three points "−1", "−2" and "−3" of the same intersection. The node/branch information memory 45 memorizes the memory address as $A_O$ and the number of branching roads as $B_O$ (=3) corresponding to the point "4" of the intersection 101. At the same time, it resets the counter 48.

Then, the branch sequence determination circuit 46 selects the branch on the left side (providing that the branches ($C_i$) are denoted by the serial numbers, 0, 1, 2, . . . from the left), namely the point "−3" of the intersection 101 as the next point of start. Thus, $C_0=0$ is satisfied. This value is also memorized in the node/branch information memory 45. On the assumption that the map data concerning the point "−3" of the intersection 101 is given by "n-words" the map data are stored in the memory of the address $A_0+n\cdot C_0$. The relevant value is produced by the adder 49, and transferred via the multiplexer 50 to the memory access circuit 26. That value and the branch information $C_0$ are written to the memory address and branching data of the temporary memory 51, respectively. At the same time that the adder 49 is started, the clock signal is fed to the counter 48 to add "1" to the contents of the counter 48. The data in the map data 33 picked out in this case concern the information on paths leading from the point "4" of the intersection 101 to the point "−3" of the same intersection. The destination address in this case represents the memory address at which the map data on the point "−3" of the intersection are stored. The data "$A_1$" is fed to the addtess register 44. Of the map data, the information on distance and orientation are fed as new data to the combination circuit 58, the time calculation circuit 59, and the orientation circuit 60. The particular data selected out of the information by the user are transferred via the multiplexer 56 to the adder/subtracter 55.

The point "−3" selected as the next point of start constitutes an exit from this intersection and has the point "1" of the intersection 102 as its sole destination, thus satisfying $B_1=1$. This is obtained by decoding the data "$A_1$" by the branch information circuit 47. In this case, since $B_1=1$, necessary memory access is effected with $A_1+n\cdot C_1=A_1$ on the condition of $C_1=0$. At the same time, the data $A_1$, $B_1$, and $C_1$ are memorized in the node/ branch information memory 45.

Subsequently, the address $A_2$ in which the information on the point "1" of the intersection 102 is stored is obtained. $B_2=2$ is determined by decoding the information. First, the leftmost branch is selected on the condition of $C_2=0$, and the procedure described above is repeated. If the counter 48 is set so as to start overflowing at the value of 5, the route leading to the desired destination is not obtained by the branch selection of $C_2=0$. In this case, therefore, the data A, B, and C memorized in the node/branch information memory 45 are followed backward until $C+1<B$ is obtained and the data $A_i$ and Chd i consequently sought out are read out. At the same time, the contents of the counter 48 are decreased by the number of backward steps taken in this case and the subsequent data memorized are erased. The data $A_i$ and $C_i$ are forwarded via the multiplexer 43 respectively to the address register 44 and the branch sequence determination circuit 46. Then, the procedure so far described is repeated on the condition of $C_i=C_i+1$. In the case of the point "1" of the intersection 102, the point "−2" of the same intersection is selected based on $C_2=1$ and the corresponding memory address is selected. On the assumption that the selected address is $A_3$, the destination from this point is limited to the point "1" of the intersection 103. Thus $C_3=0$ is set on the branch sequence determination circuit 46 on the condition of $B_3=1$. The fact that $B_4$ is 3 is known from the address $A_4$ of the point "1" of the intersection 103. When $C_4=0$ is selected, since this represents the destination, the comparator 42 issues an agreement signal for the first time.

To confirm that the route determined as described above is the shortest route desired, the following operation is carried out.

The data of the distance accumulated in the adder/subtracter 55 are compared with the data of the minimum value memory 53. If the value of the adder/subtracter 55 is smaller than that of the minimum value memory 53, the data of the adder/subtracter 55 are reloaded in place of the data of the memory 53. At the time that the minimum value memory 53 is reset, its contents have reached the highest possible numeral. At first, therefore, the total distance of the first route to the destination is written in the minimum value memory 53 unconditionally. At the same time, the memory address data (branching data) 51 are written in the optimum sequence data 52.

When the route to the destination is judged to be the optimum route as described above, the visual output display 5 and the auditory output display 6 issue a signal indicating completion of preparation. In response to this signal, the user gives a signal "yes" to the apparatus through the input device 3. On receiving the signal "yes", the timing circuit 28 of the command decoder 9 conveys the information on the manner of approach to the next intersection to the output displays 5, 6. This information is forwarded through the start code 22 and the code/memory address converter 24 to the optimum route data 52 of the optimum route search circuit 10, there to be combined with the information on left turn, straight travel, right turn, or the like. The combined information is transferred via the memory access circuit 26 to the memory 11, which selects the relevant data and displays it on the data 33. The data 33 forwards the next address, distance, orientation, and attribute information sequentially through the multiplexer 30 to the output displays 5, 6 to be displayed thereon. The next instruction of the optimum sequence data 52 is also displayed on the output displays 5, 6.

The next address to be displayed on the output displays is the code number of the next intersection and the distance data represent the distance to the next intersection. The orientation data are to indicate the direction (angle) in which the road to the next intersection extends. The attribute information represents conspicuous landmarks for the next intersection. It embraces names and shapes of buildings, and marks. With the aid of the information displayed on these output displays, the user proceeds to the next instruction. When the user en route to the next intersection finds the conditions of the nearby street not in agreement with the displayed information, he gives a signal through the input device 3 and causes the apparatus to display the information once more.

In this manner, the user proceeds toward the fixed intersection. After elapse of a fixed length of time, the output device issues a question as to whether the user has reached the intersection (FIG. 5). In response to this question, the user reflects on his own observation of the features of the streets so far passed, compares the features observed with those displayed by the output displays, and determines whether or not he has reached the intersection. If he judges he has reached the intersection, he gives an input signal "yes". The timing circuit 28, on receiving the input signal "yes", issues a signal to the data 33 and effects an access to the next information with the aid of the optimum route data 52 of the optimum route search circuit 10. Consequently, the information further covering the next intersection is displayed on the output displays 5, 6.

When the user judges that he has not reached the correct intersection, he gives an input signal "no" to the apparatus and feeds the information on his present position as the point of start. Consequently, the new route search and the relevant memorized information in relation to the initially designated destination are displayed on the output displays. The user now proceeds along a route which conforms to the newly given information.

When the intersection reached is the correct intersection and this correct intersection is the user's destination, the guidance of the user along the route is completed. If this intersection does not turn out to be the destination, the information about the route to the next intersection are displayed in much the same way as described above.

The map display apparatus of this invention enables a blind person or a foreigner who is a stranger to an area to be easily guided through the optimum route from a given point of start to his destination. The user is guided to the destination of his choice via the optimum route on the basis of the information stored in the memory. When an auditory device is used as the output device in this apparatus, a person operating an automobile will also find this apparatus to be a convenient guide.

Obviously, many modifications and variations of the present invention are possible in light of the above teachings. It is therefore to be understood that within the scope of the appended claims, the present invention may be practiced otherwise than as specifically described herein.

What is claimed is:

1. A portable map display apparatus, comprising:

memory means for storing therein (a) a multiplicity of specific point locations within a predetermined geographical region, (b) substantially fixed, non-variable topographical features characteristic of said multiplicity of specific point locations within said predetermined geographical region, and (c) substantially fixed, non-variable topographical features characteristic of a plurality of different routes interconnecting said multiplicity of specific point locations within said predetermined geographical region;

means for selectively inputting into said apparatus predetermined criteria by means of which an optimum route of travel can be determined, from said plurality of different routes interconnecting said multiplicity of specific point locations within said predetermined geographical region, between a predetermined point of start within said predetermined geographical region as selected from said multiplicity of specific point locations within said predetermined geographical region and a predetermined point of destination within said predetermined geographical region as selected from said multiplicity of specific point locations within said predetermined geographical region;

optimum route determination means for determining said optimum route of travel, between said selected predetermined point of start and said selected predetermined point of destination, as dictated by said substantially fixed, non-variable topographical features characteristic of said multiplicity of specific point locations, and said substantially fixed, non-variable topographical features characteristic of said plurality of different routes interconnecting said multiplicity of specific point locations, within said predetermined geographical region, and in response to said selected predetermined criteria inputted into said apparatus; and means for displaying information characteristic of said optimum route, determined by said apparatus, defined between said selected predetermined point of start and said selected predetermined point of destination.

2. Apparatus as set forth in claim 1, wherein:

one of said substantially fixed, non-variable topographical features characteristic of said multiplicity of specific point locations within said predetermined geographical region comprises the type of intersection defined at a selected one of said multiplicity of specific point locations.

3. Apparatus as set forth in claim 1, wherein:

one of said substantially fixed, non-variable topographical features characteristic of said plurality of different routes interconnecting said multiplicity of specific point locations within said predetermined geographical region comprises the distance between said multiplicity of specific point locations.

4. Apparatus as set forth in claim 1, wherein:

one of said substantially fixed, non-variable topographical features characteristic of said plurality of different routes interconnecting said multiplicity of specific point locations within said predetermined geographical region comprises the direction of travel of vehicular traffic upon a predeterminedly selected route between said point of start and point of destination.

5. Apparatus as set forth in claim 1, wherein:
one of said substantially fixed, non-variable topographical features characteristic of said plurality of different routes interconnecting said multiplicity of specific point locations within said predetermined geographical region comprises road inclination conditions upon a predeterminedly selected route between said point of start and point of destination.

6. Apparatus as set forth in claim 1, wherein:
one of said predetermined criteria for determining said optimum route of travel between said predetermined point of start and said predetermined point of destination comprises the minimum distance to be traveled between said predetermined point of start and said predetermined point of destination.

7. Apparatus as set forth in claim 1, wherein:
one of said predetermined criteria for determining said optimum route of travel between said predetermined point of start and said predetermined point of destination comprises the minimum number of corners to be turned when travelling between said predetermined point of start and said predetermined point of destination.

8. Apparatus as set forth in claim 1, wherein:
one of said predetermined criteria for determining said optimum route of travel between said predetermined point of start and said predetermined point of destination comprises the minimum number of intersections to be crossed.

9. Apparatus as set forth in claim 1, wherein:
one of said predetermined criteria for determining said optimum route of travel between said predetermined point of start and said predetermined point of destination comprises the travel time required to travel between said predetermined point of start and said predetermined point of destination.

10. Apparatus as set forth in claim 1, wherein:
said means for displaying said information characteristic of said optimum route comprises a visual display.

11. Apparatus as set forth in claim 1, wherein:
said means for displaying said information characteristic of said optimum route comprises an auditory display.

12. Apparatus as set forth in claim 1, wherein:
said means for displaying said information characteristic of said optimum route comprises a tactile display.

* * * * *